(12) United States Patent
Wright et al.

(10) Patent No.: US 6,299,258 B1
(45) Date of Patent: Oct. 9, 2001

(54) COMPOSITE AXLE FOR CONTAINERS AND THE LIKE

(75) Inventors: Gordon C. Wright, Charlotte; Daniel J. Sweeney, Lansing, both of MI (US)

(73) Assignee: 21st Century Plastics Corporation, Potterville, MI (US)

( * ) Notice: Subject to any disclaimer, the term of this patent is extended or adjusted under 35 U.S.C. 154(b) by 0 days.

(21) Appl. No.: 09/384,067

(22) Filed: Aug. 26, 1999

(51) Int. Cl.⁷ .................................................... B60B 35/00
(52) U.S. Cl. ....................................... 301/124.1; 301/131
(58) Field of Search ................................ 301/124.1, 125, 301/126, 131, 132; 280/47.26

(56) References Cited

U.S. PATENT DOCUMENTS

| | | |
|---|---|---|
| 427,636 | 5/1890 | Swalley . |
| 470,261 | 3/1892 | Sheldon . |
| 479,618 | 7/1892 | Bettendorf . |
| 905,673 | 12/1908 | Elliott . |
| 922,684 | 5/1909 | Ette . |
| 1,170,172 * | 2/1916 | Litchfield ........................... 301/124.1 |
| 2,132,725 | 10/1938 | Davis . |
| 2,133,091 | 10/1938 | Gettig . |
| 2,370,773 * | 3/1945 | Bradley ............................. 301/124.1 |
| 2,388,441 | 11/1945 | Ressinger . |
| 3,492,016 | 1/1970 | O'Connor et al. . |
| 3,501,202 | 3/1970 | Hanley et al. . |
| 3,638,352 | 2/1972 | Christiansen . |
| 3,869,265 * | 3/1975 | Wolter et al. ........................... 55/274 |
| 3,966,260 | 6/1976 | Braun . |
| 4,200,326 | 4/1980 | Wilcox . |
| 4,380,480 | 4/1983 | Delfino et al. . |
| 4,450,976 | 5/1984 | Snyder et al. . |
| 4,671,434 * | 6/1987 | Johnston et al. ..................... 222/625 |
| 4,802,876 | 2/1989 | Bertrand . |
| 4,927,171 | 5/1990 | Westerlund . |
| 4,927,205 * | 5/1990 | Bowler et al. ......................... 294/94 |
| 5,000,467 | 3/1991 | Becca . |
| 5,129,672 | 7/1992 | Hiromoto et al. . |
| 5,180,178 | 1/1993 | Caceres . |
| 5,285,936 | 2/1994 | Matricardi, Jr. . |
| 5,547,104 | 8/1996 | Parker . |
| 5,603,555 | 2/1997 | Dickey . |
| 5,647,463 | 7/1997 | Richter . |
| 5,716,107 | 2/1998 | Parker et al. . |

* cited by examiner

Primary Examiner—Russell D. Stormer
Assistant Examiner—Long Bao Nguyen
(74) Attorney, Agent, or Firm—Price, Heneveld, Cooper, DeWitt & Litton

(57) ABSTRACT

A one-piece injection mold composite axle for containers includes an elongated body portion having an I-shaped cross section. The elongated body portion defines opposite ends, each of which has a spindle integrally formed thereon for carrying a wheel mounting part. The axle is formed of a non-corroding fiber reinforced polymer material.

4 Claims, 2 Drawing Sheets

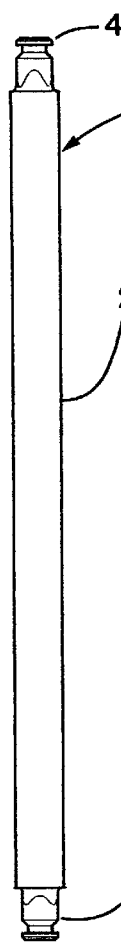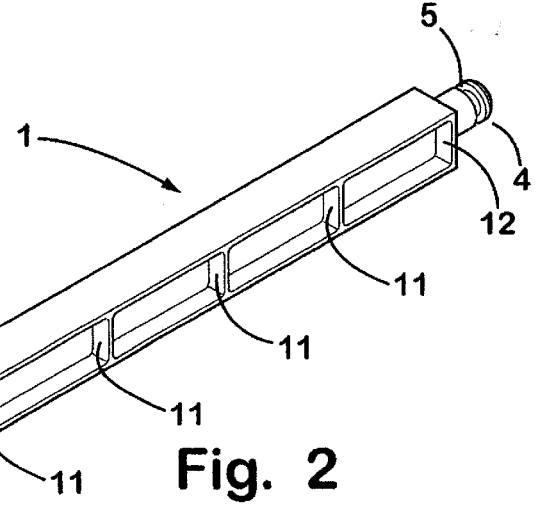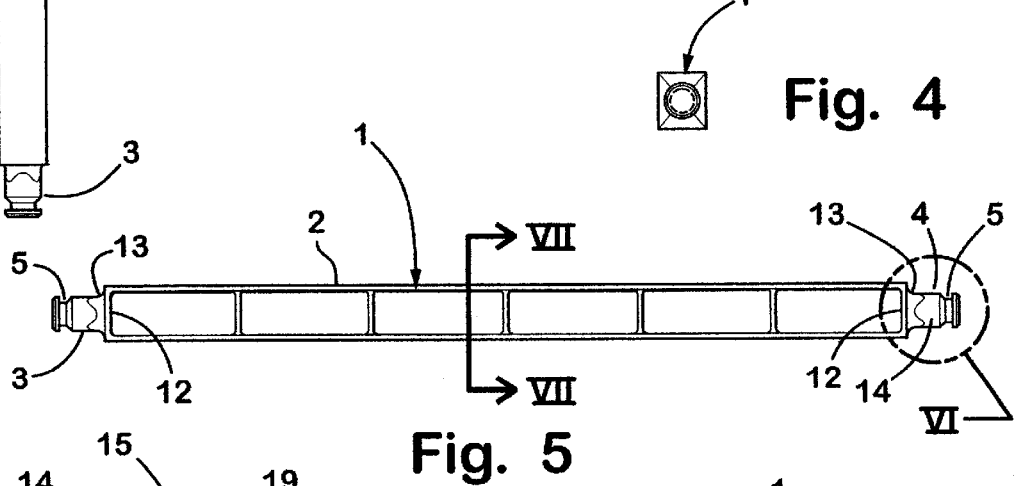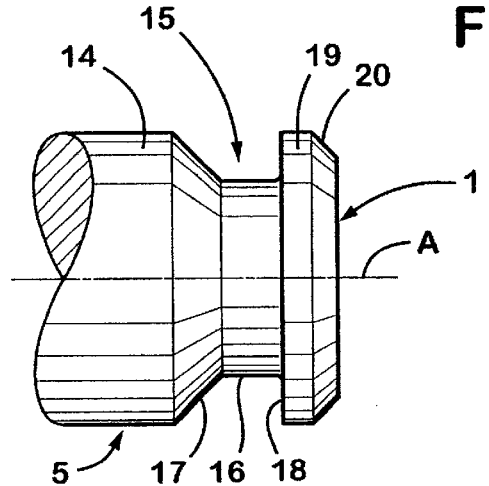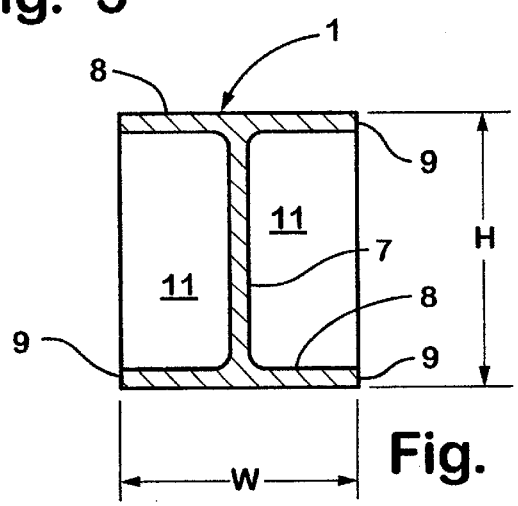

COMPOSITE AXLE FOR CONTAINERS AND THE LIKE

BACKGROUND OF THE INVENTION

Various containers have been developed for storing and/or transporting waste or other materials. Such containers may be made from molded polymer or other similar materials, and commonly include a cover to prevent accumulation of water and to retain the waste material in the container. Such containers may include two or more wheels at the lower portion of the container to facilitate movement of the container. Waste containers may be subjected to substantial loads when heavy objects are placed in the container, and known containers typically have a steel axle to support the load. However, because such containers are commonly left outdoors for extended lengths of time, corrosion of the steel axles occurs. Furthermore, such axles also add weight to the container, making the container difficult to handle. Accordingly, an axle alleviating the above problems was desired.

SUMMARY OF THE INVENTION

One aspect of the present invention is a one-piece injection molded composite axle for containers including an elongated body portion having an I-shaped cross section. The elongated body portion defines opposite ends, each of which has a spindle integrally formed thereon for carrying a wheel mounting part. The axle is formed of a non-corroding fiber reinforced polymer material.

Another aspect of the present invention is a wheeled container including a container body forming a cavity that is shaped to retain articles therein. The container body has an opening configured to provide access to the cavity to permit insertion and removal of articles in the cavity. The container body has a lower portion defining a pair of spaced-apart generally vertical sidewalls, each sidewall having an opening therethrough. The wheeled container also includes an elongated composite axle made of a fiber reinforced polymer material extending between the vertical sidewalls. The composite axle defines integral spindles at opposite ends thereof, a portion of each spindle extending through a selected one of the openings. First and second wheels are rotatably mounted on the spindles.

Yet another aspect of the present invention is a composite axle for containers including an elongated body defining an axis and having an I-shaped cross section formed by a vertical web and parallel, spaced-apart horizontal wall sections. Each horizontal wall section defines opposite side edges that are horizontally spaced-apart from the vertical web. The elongated body further includes a plurality of reinforcement ribs extending between the horizontal wall sections transverse to the vertical web. The reinforcement ribs are connected with the vertical web and the horizontal wall section, and are integrally formed therewith. The composite axle is made of a fiber reinforced composite material.

These and other features, advantages, and objects of the present invention will be further understood and appreciated by those skilled in the art by reference to the following specification, claims, and appended drawings.

BRIEF DESCRIPTION OF THE DRAWING

FIG. 2 is a perspective view of the composite axle of FIG. 1;

FIG. 3 is a top plan view of the composite axle of FIG. 1;

FIG. 4 is a front elevational view of the composite axle of FIG. 1;

FIG. 5 is a side elevational view of the composite axle of FIG. 1;

FIG. 6 is a fragmentary, enlarged view of the spindle of FIG. 5;

FIG. 7 is a cross-sectional view of the composite axle taken along the line VII—VII; FIG. 5.

DETAILED DESCRIPTION OF THE PREFERRED EMBODIMENT

Figure 1:
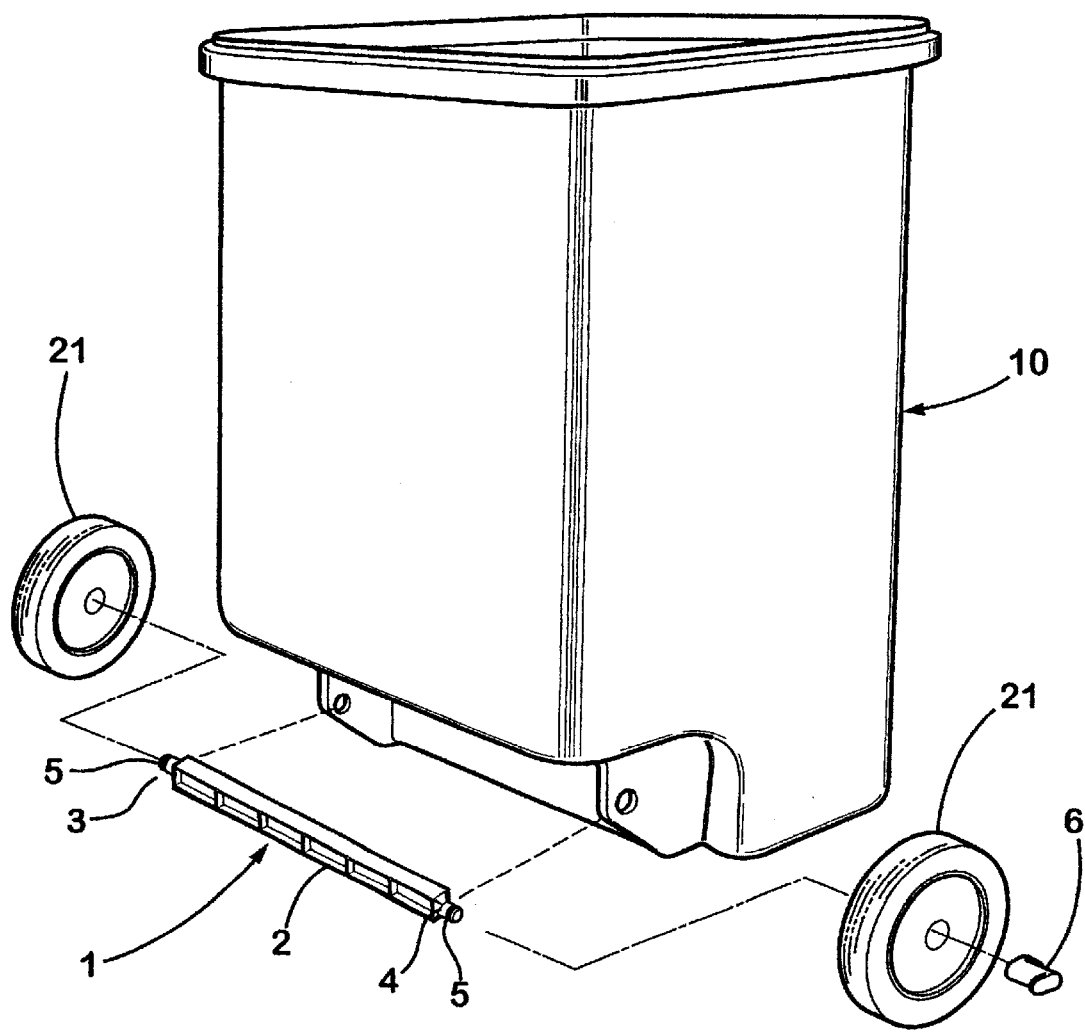
FIG. 1 is a partially exploded, perspective view of a container embodying the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIG. 1) generally designates a composite axle embodying the present invention, which is particularly suited for use with waste containers and the like. In the illustrated example, the axle 1 is a one-piece injection molded composite axle for wheeled containers, such as the waste container 10. Composite axle 1 includes an elongated body portion 2 having an I-shaped cross section (see also FIG. 7). The elongated body portion 2 defines opposite ends 3, 4, each of which has a spindle 5 integrally formed thereon for carrying a wheel mounting part such as a lug 6 thereon. The composite axle 1 is formed of a non-corroding fiber reinforced polymer material.

Substantial weight may be placed in container 10, resulting in high bending loads being applied to the axle 1. Accordingly, the I-shaped cross section of the composite axle 1 provides a lightweight design with bending strength. In a preferred embodiment, the composite axle 1 is made of an injection molded 50% long glass fiber reinforced polypropylene having a tension modulus of 2,000,000 psi, and a tension strength of 19,000 psi. Because the long fibers become intertangled, the material has strength and stiffness properties that are substantially unidirectional. Due to the unidirectional properties of the long fiber composite material, the criticality of material flow and fiber orientation during fabrication is substantially reduced. This material is preferably black for ultraviolet (UV) resistance. The one-piece, unitary injection molded construction of axle 1 eliminates the need for axle spacers or other similar components, thereby eliminating assembly and/or adhesive requirements associated with conventional axle designs. Various commercially available computer programs have been developed for analyzing mold flow characteristics. Furthermore, various injection molding tools and processes are known, and, hence, will not be further described herein.

With reference to FIG. 7, the I-shaped cross section of composite axle 1 is formed by a generally vertical center web 7, with spaced-apart horizontal walls 8. Web 7 and walls 8 preferably have a thickness of about 0.110 inches. Each of the horizontal walls defines a free edge or end 9 that is horizontally spaced-apart from the center web 7. With further reference to FIG. 2, composite axle 1 also includes a plurality of spaced-apart reinforcement ribs 11 that extend transversely from the vertical web 7, and also span between the horizontal wall sections 8. Ribs 11 are integrally formed with wall sections 8 and web 7 and have a thickness of about 0.040 inches. Elongated body portion 2 of composite axle 1 preferably has a width "W" of about 1.00 inches, and a height "H" of about 1.50 inches in a preferred embodiment. However, it is anticipated that the dimensions could be varied if, for example, a stronger axle were needed for a particular application. The overall length of a preferred embodiment of axle 1 is about 22.5 inches. Finite element analysis of composite axle 1 indicates that the maximum deflection under a 1,000 lb. load distributed across four points of the axle is only 0.136 inches. This compares favorably to ⅝ inch and ⅞ inch steel axles, which have calculated deflections of 1.659 and 0.0438 inches, respectively. Furthermore, composite axle 1 saves 3.2 or more pounds compared to existing steel axles. Composite axle 1 also includes rectangular plate-like sections 12 at each end 3, 4. Each spindle 5 includes a cylindrical portion 14, and a tapered transition portion 13 that extends between the plate-like portion 12 and the cylindrical portion 14. The transition 13 carries the loads placed on the spindles 5 to the I-shaped cross section of the elongated body portion 2 of the composite axle 1. In particular, a substantial portion of the bending load is transferred to the horizontal walls 8 to provide an efficient structural interconnection between the cylindrical portion 14 of spindle 5, and the I-shaped cross section of the elongated body portion 2.

With reference to FIG. 6, each spindle 5 includes an annular groove or channel 15 having a generally straight base surface 16, and first and second side surfaces 17 and 18. In a preferred embodiment, the first side surface 17 extends at about a forty five degree angle with respect to the axis "A" of the composite axle 1. Annular groove 15 forms a disc-like end portion 19 having a chamfered portion 20. The annular groove 15 receives a mounting lug 6 to retain the wheels 21 (FIG. 1) on the spindles 5. In a preferred embodiment the cylindrical portion 14 of the spindle 5 has a diameter of 0.875 inches, and the cylindrical portion of the spindle 5 formed by the base surface 16 of annular groove 15 has a diameter of 0.675 inches. Various types of self locking wheel attachments/spindle designs are known, such that the dimensions and location of groove 15, as well as the size of cylindrical portion 14 may be varied as required for a particular application.

The composite axle of the present invention provides a substantial weight savings compared to known steel axles. Furthermore, the one-piece, unitary construction eliminates the need for separate parts, such as axle spacers, thereby reducing the complexity and associated cost of the axle. Furthermore, the composite construction is not only strong and lightweight, but also does not corrode when exposed to the elements.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A one-piece injection molded composite axle for containers, comprising:

an elongated body portion having an I-shaped cross section, said elongated body portion defining opposite ends, each of which has a spindle integrally formed thereon for carrying a wheel mounting part thereon, said axle formed of a non-corroding fiber reinforced polymer material;

each spindle includes an annular groove for receiving a wheel mounting component; and wherein:

said fiber reinforced polymer material is a fifty percent long glass fiber reinforced polypropylene.

2. The composite axle set forth in claim 1, wherein:

each said annular groove has a generally flat base surface and first and second spacedapart side surfaces, said first side surface extending at angle of about forty five degrees relative to said second side surface.

3. A wheeled container, comprising:

a container body forming a cavity that is shaped to retain articles therein, said container body having an opening configured to provide access to said cavity to permit insertion and removal of articles in said cavity, said container body having a lower portion defining a pair of spaced-apart, generally vertical sidewalls, each sidewall having an opening therethrough;

an elongated composite axle made of a fiber reinforced polymer material and extending between said vertical sidewalls, said composite axle having an I-shaped cross-sectional configuration and defining integral spindles at opposite ends thereof, a portion of each spindle extending through a selected one of said openings, each said spindle including an annular groove for receiving a wheel mounting component;

first and second wheels rotatably mounted on said spindles;

said composite axle includes a plurality of spaced-apart reinforcement ribs extending transversely from a central web of said I-shaped cross-section;

said groove has a base surface and first and second spaced-apart side surfaces, said first side surface extending at an angle relative to said second side surface; and wherein:

each said spindle has a cylindrical portion and a tapered transition extending between said I-shaped cross section and said cylindrical portion of said spindles.

4. A composite axle for containers, comprising:

an elongated body defining an axis and having an I-shaped cross section formed by a vertical web and parallel, spaced-apart horizontal wall sections, each horizontal wall section defining opposite side edges that are horizontally spaced-apart from said vertical web, said elongated body further including a plurality of reinforcement ribs extending between said horizontal wall sections transverse to said vertical web, said reinforcement ribs connected with said vertical web and said horizontal wall section and integrally formed therewith, said composite axle made of a fiber reinforced composite material; said elongated body defining opposite ends, each of which includes a spindle integrally formed therewith;

each spindle including an annular groove shaped to receive a wheel mounting lug; and wherein:

each said opposite end includes a flat rectangular wall extending transverse to said axis of said axle; and each spindle includes a cylindrical portion and a tapered transition extending between said flat rectangular wall and said cylindrical portion.

* * * * *